United States Patent [19]

Cohen

[11] Patent Number: 4,985,821
[45] Date of Patent: Jan. 15, 1991

[54] INDIRECT CURRENT SENSING OF DC TO DC CONVERTERS

[75] Inventor: Itzchak Cohen, Dix Hills, N.Y.

[73] Assignee: Lambda Electronics Inc., Melville, N.Y.

[21] Appl. No.: 509,897

[22] Filed: Apr. 16, 1990

[51] Int. Cl.[5] .................................... H02M 7/44
[52] U.S. Cl. ........................... 363/95; 363/21; 363/56; 363/131
[58] Field of Search .............. 363/15, 21, 55, 56, 363/95, 97, 131

[56] References Cited

U.S. PATENT DOCUMENTS

| | | | |
|---|---|---|---|
| 4,146,832 | 3/1979 | McConnell | 363/19 |
| 4,389,702 | 6/1983 | Clemente et al. | 363/56 |
| 4,410,936 | 10/1983 | Suzuki | 363/21 |
| 4,535,399 | 8/1985 | Szepesi | 363/97 |
| 4,608,625 | 8/1986 | Josephson et al. | 363/21 |
| 4,628,429 | 12/1986 | Walker | 363/97 |
| 4,763,238 | 8/1988 | Maige | 363/56 |

Primary Examiner—Steven L. Stephan
Assistant Examiner—Jeff Sterrett
Attorney, Agent, or Firm—Morgan & Finnegan

[57] ABSTRACT

Disclosed are circuits for indirectly sensing and controlling the output current of switching type DC to DC converters utilizing capacitance which follows the output voltage by being responsive to switching current during the conduction period and being controllably discharged as a function of output voltage during the non-conduction period.

8 Claims, 2 Drawing Sheets

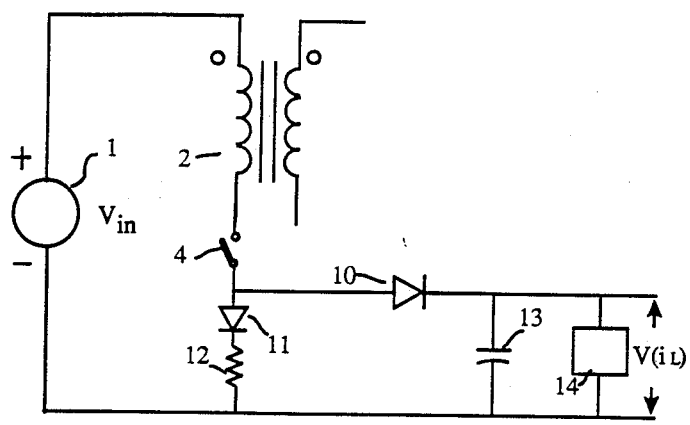
FIGURE 3
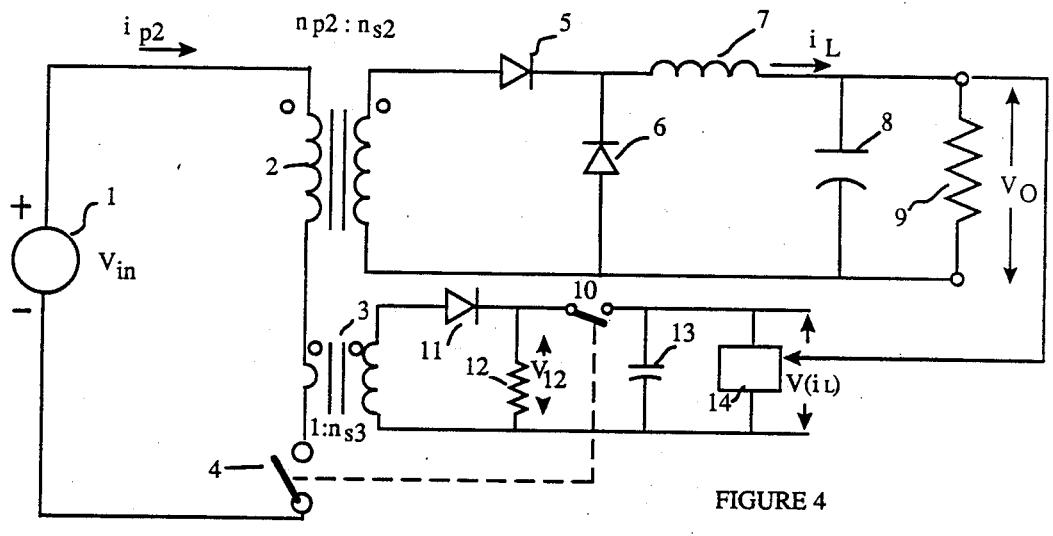
FIGURE 4A
FIGURE 4

INDIRECT CURRENT SENSING OF DC TO DC CONVERTERS

BACKGROUND OF THE INVENTION

The present invention relates to electronic power converters and more particularly to a circuit for sensing the output current of such converters for control purposes In power converters, it is necessary in many cases to accurately sense the output current of the converter for either measurement or control purposes A simple way to accomplish this objective is to connect a shunt in series with the output, but this straight-forward method suffers from several disadvantages. These include considerable bulk and power dissipation when high currents are measured and the incapability of providing an isolated current signal This last problem is particularly significant in the case of isolated converters where the control circuit is located in the primary side and galvanic connection between the primary and the secondary side is not allowed.

Although current sensing circuits based on magnetic amplifiers have long been known in the art, these circuits are complex, bulky and expensive and generally unsuitable for use in high density converters.

OBJECTS OF THE INVENTION

It is accordingly an object of the invention to ameliorate the foregoing disadvantages.

Another object of the current invention is to provide accurate sensing of output currents of DC to DC converters with a circuit that is simple, compact and inexpensive as compared to prior art units. It is a further object of the present invention to provide a voltage signal proportional to the output current which can either be floating or be referred to an arbitrary common point and the amplitude of which can be made arbitrarily large without materially affecting power consumption of the circuit The sense signal may be used for control and other purposes.

SUMMARY OF THE INVENTION

The foregoing objects are achieved in a DC to DC converter employing power switches by a technique of indirect sensing of output current in which the voltage across capacitance means is controlled to follow a sensing voltage derived from current flow through the converter power switches. During the non-conduction period, the capacitance means are effectively isolated from the power switch current sensing means and controllably discharged as a function of the converter output voltage.

BRIEF DESCRIPTION OF THE DRAWINGS

Serving to illustrate embodiments of the invention are the drawings of which:

FIG. 3 is a schematic diagram which shows an embodiment of present invention that does not use a current transformer and generates a signal referred to the primary side of a converter;

FIG. 4 is a schematic illustration of an embodiment of the invention in which a diode has been replaced by a driven sampling switch.

FIG. 4A is a schematic diagram of an exemplary voltage controlled current source indicated in the other figures by block 14.

DESCRIPTION OF THE PREFERRED EMBODIMENTS

Figure 1:
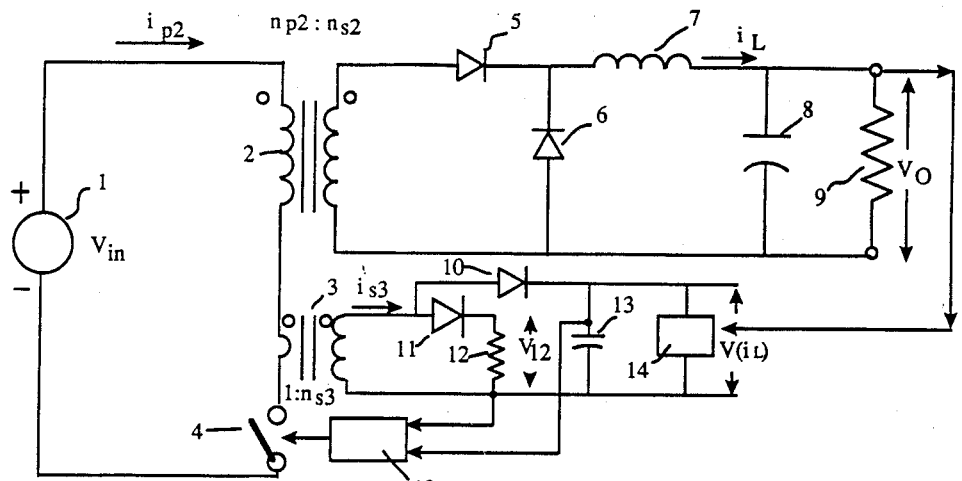
FIG. 1 is a schematic diagram which depicts a forward converter circuit with the current sensing circuit referred to its secondary.

FIG. 1 shows a DC to DC converter of the forward type. This topology, which is probably the simplest of the various embodiments, is used here for clarity and it will be immediately apparent to those versed in the art that the current sensing circuit described here will work equally well when applied to more complex topologies such as half bridges, full bridges, etc. Again, for the sake of facilitating this description, it is assumed that transformers have infinite magnetizing inductance and zero leakage inductance and that all reactive components have zero losses.

In a practical application, deviation from the ideal case will degrade somewhat the sensing accuracy, but those versed in the art will be able to minimize the deviation by using well established design techniques.

With reference to FIG. 1 when the power switch (4) of the converter turns on, the flywheel diode (6) turns off and the inductor current $i_L$ will flow through the forward diode (5) and the secondary winding $n_{s2}$ of the power transformer (2) being related to primary current $i_{p2}$ by the turns ratio of the transformer.

$$i_{p2} = i_L \times \frac{n_{s2}}{n_{p2}} \quad (1)$$

The current $i_{s3}$ flowing through the secondary of the current transformer (3) will be:

$$i_{s3} = i_{p2} * \frac{1}{n_{s3}} = i_L * \frac{n_{s2}}{n_{s3}} * n_{p2} \quad (2)$$

This current will generate a voltage $v_{12}$ across the sense resistor (12) of resistance R, which is given by:

$$v_{12} = i_{s3} * R = i_L * \frac{R n_{s2}}{n_{s3} * n_{p2}} \quad (3)$$

Due to the conduction of diodes (10) and (11), the voltage across capacitor (13) will be essentially the same as $v_{12}$. Thus, it will follow exactly the voltage $v(i_L)$ for as long as there is current in the secondary of current transformer (3) and diodes (10) and (11) conduct This will be the case during the conduction period of switch (4). During that period:

$$v(i_L) = v_{12} \quad (4)$$

Examination of equation (3) reveals that the voltage $v_{12}$ and consequently $v(i_L)$ are an accurate analog of the inductor current $i_L$ during the conduction period of switch (4), therefore, the circuit provides an accurate image of the inductor current during this period.

When switch (4) turns off, the current flowing through the primary of transformer (2) is interrupted, diode (5) turns off and the inductor current $i_L$ freewheels through the diode (6). It should be noted that during this period, the conduction of diode (6) forces the output voltage of the converter, $v_o$, to appear across the inductor, causing the current in the inductor to decay at a rate given by:

$$\frac{d(i_L)}{dt} = \frac{v_o}{L} \qquad (5)$$

At the end of the conduction period of switch (4), the voltage $V(i_L)$ will have reached a value proportional to the peak value of the inductor current and in the absence of additional circuit elements would have remained indefinitely at this value, since the diodes (10) and (11) have turned off. However, if the capacitor 13 can be made to discharge at a rate proportional to the rate of decay of the current inductor (7), the voltage $v(i_L)$ will become an accurate analog of the inductor current at any instant of time, thus achieving a principal objective of this invention.

The correct rate of discharge of the capacitor (13) is established by the voltage controlled current source (14). This source accepts the output voltage $v_o$ of the converter as an input and generates a discharge current proportional to it, thereby causing the voltage to decay at a rate proportional to the decay rate of the inductor current:

$$i_{14} = K\, v_o \qquad (6)$$

The proportionality constant K is calculated as follows:

$$\frac{dv(i_L)}{dt} = \frac{i_{14}}{C} = \frac{K v_o}{C} \qquad (7)$$

In order to obtain the correct signal, we require:

$$\frac{dv(i_L)}{dt} = \frac{di_L}{dt} * R \frac{n_{s2}}{n_{s3}\, n_{p2}} \qquad (8)$$

Substituting (5) into (8) yields:

$$\frac{dv(i_L)}{dt} = \frac{v_o}{L} * R \frac{n_{s2}}{n_{s3}\, n_{p2}} \qquad (9)$$

Equating (9) and (7) and solving for K yields:

$$K = \frac{C}{L} * R * \frac{n_{s2}}{n_{s3}\, n_{p2}} \qquad (10)$$

Thus, setting the value of the voltage-to-current conversion constant K equal to expression (10) will result in a sensing voltage $v(i_L)$ that is related to the inductor current by a factor $$R * \frac{n_{s2}}{n_{s3}\, n_{p2}}.$$

That is, $$v(i_L) = i_L * R * \frac{n_{s2}}{n_{s3}\, n_{p2}} \qquad (11)$$

The sensing voltage $v(i_L)$ is typically used for regulation as by controlling the power switching 4 via a suitable control circuit 19.

The converter 14 may be implemented with any one of the many known voltage-to-current converter circuits with its topology and parameters being selected according to the desired power supply specifications.

Illustrative is the circuit of FIG. 4A in which a fraction $k * v_o$ of the output voltage is applied to an op amp 20, the output of which is connected to the base of transistor 21. The emitter and the other input terminal of op amp 20 are returned to ground through a resistor 22. The collector of the transistor is connected to the controlled capacitor 13.

Figure 2:
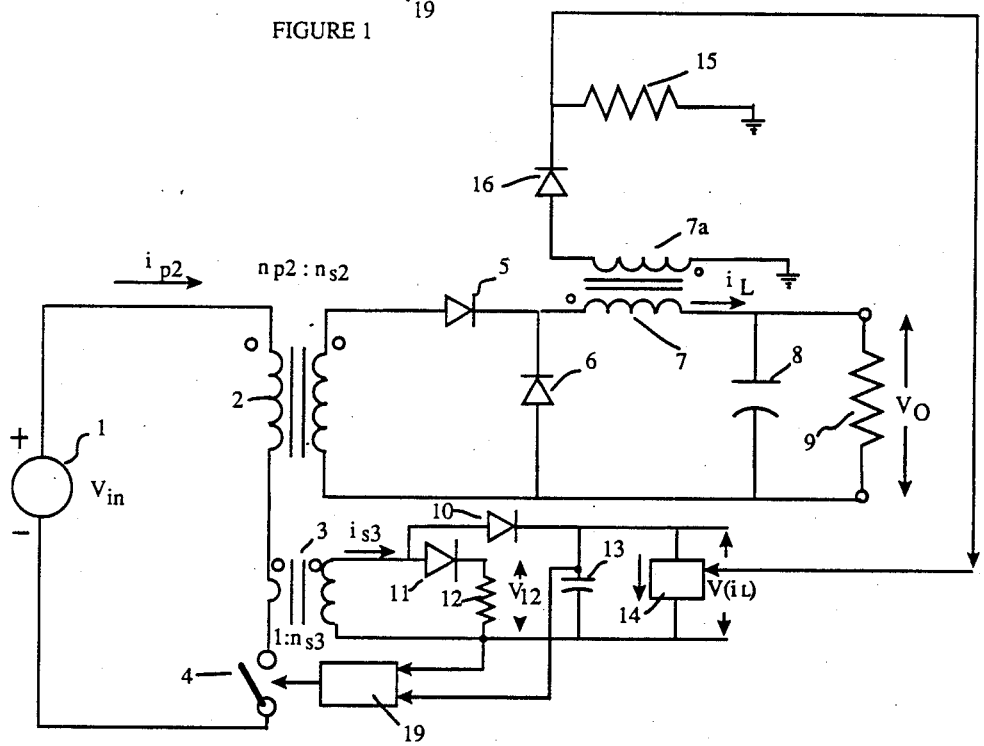
FIG. 2 schematically depicts a forward converter with the current sensing circuit referred to a floating reference point.

FIG. 2 is an embodiment of the current sensing circuit useful for applications where floating current sensing is required. The circuit here is modified by adding a windings (7a) to inductor (7) for the purpose of translating a function of the output voltage $v_o$ to the sensing circuit.

Otherwise, the operation of this circuit is identical to the operation of the circuit in FIG. 1.

The voltage translation operates as follows:

When switch (4) is on, a voltage appears across inductor (7) polarized as shown by the polarity dot. The voltage across winding (7a) is polarized such that diode (16) is blocked and the voltage across resistor (15) thus remains at zero. When switch (4) turns off, the voltage across winding (7) will reverse and become equal to the output voltage $v_o$. If we assume a 1:1 turns ratio between windings (7) and (7a), the voltage $v_o$ will now appear across the resistor (15), providing this value to the voltage-to-current converter (14).

FIG. 3 illustrates an embodiment of the circuit wherein the current through switch (4) is sensed directly rather than via a current transformer. It too embodies a feedback control circuit, not shown, such as control stage 19 of FIGS. 1 and 2.

In the embodiment of FIG. 4, the sense circuit diode (10) of FIG. 1 has been eliminated and the voltage of capacitor (13) is obtained by sampling the voltage across the resistor (12) via the sampling switch (10). The latter is driven in synchronism with switch (4); i.e., both switches are opened and closed simultaneously. In other respects, including feedback control, FIG. 4 is comparable to the other embodiments.

After considering the preferred embodiments described herein, it will become apparent to those skilled in the art that the current sensing strategy disclosed herein can be implemented with various modifications of the described embodiments including use of different methods of voltage translation. Also indicated is use of the sensing circuit for topologies other than forward converters.

What is claimed is:

1. An indirect output current sensing system for DC converters employing power switches and having a load-current-carrying circuit and output terminals, comprising:
   (a) means for sensing the current in the converter's power switches during their conduction period, the said means producing a sensing voltage having an instantaneous value indicative of the instantaneous value of the said current;
   (b) capacitance means coupled to said sensing means;
   (c) means for forcing the voltage across said capacitance means to follow said sensing voltage;

(d) means for decoupling said capacitance means from said sensing means at the end of the conduction period of the converter's power switches; and (e) means for providing a discharge current for said capacitance means during the non-conducting period of the converter's power switches such that the voltage across said capacitance means is indicative of the output current of said converter.

2. The sensing system of claim 1, wherein said means for decoupling comprise diode means coupled to said capacitance means.

3. The sensing system of claim 1 wherein said means for decoupling comprise switching means synchronized with said power switches and coupled to said capacitance means.

4. The sensing system of claim 1 in which said means for sensing the current in the converter's power switches comprise transformer means coupled to the circuit of said power switches.

5. The sensing system of claim 4 in which the primary of said transformer means is connected to carry said converter power switch current and in which the secondary of said transformer means include diode means for unidirectionally supplying a current to said capacitance means.

6. The sensing system of claim 1 in which said means for providing said discharge current comprise voltage-to-current converter means coupled to said capacitance means.

7. The sensing system of claim 6 in which said voltage-to-current converter means is responsive to the voltage across the output terminals of said converter.

8. The sensing system according to claim 6 in which said voltage-to-current converter means is transformer coupled to said load-current-carrying circuit of said converter.

* * * * *